US009327547B2

(12) United States Patent
Morishita et al.

(10) Patent No.: US 9,327,547 B2
(45) Date of Patent: May 3, 2016

(54) VEHICLE WHEEL DISK

(75) Inventors: Kenji Morishita, Tokyo (JP); Masafumi Bojo, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/115,037

(22) PCT Filed: Apr. 2, 2012

(86) PCT No.: PCT/JP2012/058810
§ 371 (c)(1),
(2), (4) Date: Oct. 31, 2013

(87) PCT Pub. No.: WO2012/153577
PCT Pub. Date: Nov. 15, 2012

(65) Prior Publication Data
US 2014/0070601 A1 Mar. 13, 2014

(30) Foreign Application Priority Data

May 9, 2011 (JP) ................................. 2011-104673
Jun. 22, 2011 (JP) ................................. 2011-137945

(51) Int. Cl.
B60B 3/10 (2006.01)
B60B 1/06 (2006.01)
B60B 3/00 (2006.01)
B60B 3/04 (2006.01)

(52) U.S. Cl.
CPC ... B60B 1/06 (2013.01); B60B 3/10 (2013.01); B60B 3/005 (2013.01); B60B 3/04 (2013.01); B60B 2900/311 (2013.01); B60Y 2200/11 (2013.01); B60Y 2200/14 (2013.01)

(58) Field of Classification Search
CPC ..................................... B60B 1/06; B60B 3/10
USPC ............. 301/63.101, 63.104, 63.105, 63.106, 301/64.101
See application file for complete search history.

(56) References Cited

U.S. PATENT DOCUMENTS 3,506,311 A * 4/1970 Nobach .................... 301/63.105
6,073,347 A * 6/2000 Cvijanovic et al. ...... 29/894.323
(Continued)

FOREIGN PATENT DOCUMENTS

CA          2591366 A1     12/2007
CN          202294042       7/2012
(Continued)

OTHER PUBLICATIONS

International Search Report issued in PCT/JP2012/058810 mailed May 22, 2012.
(Continued)

Primary Examiner — Hau Phan
(74) Attorney, Agent, or Firm — DLA Piper LLP (US)

(57) ABSTRACT

A spoke 15 has a spoke crest 15a, a spoke radially outer wall 15b and a pair of spoke circumferential side walls 15c. In a cross section of the spoke 15 along a radial direction of a disk, a crest outer curved portion 15a2 of the spoke crest 15a is curved at a larger curvature than curvatures of a crest inner curved portion 15a1 of the spoke crest 15, a crest main portion 15a4 of the crest and the spoke radially outer wall 15b. Thus, compared with a conventional one, a configuration of the spoke 15 becomes like a box. As a result, a bending strength and a bending rigidity of the spoke 15 in the radial direction of the disk can be improved.

17 Claims, 9 Drawing Sheets

(56) References Cited

U.S. PATENT DOCUMENTS

| | | | |
|---|---|---|---|
| 7,059,685 B2* | 6/2006 | Kermelk et al. | 301/64.101 |
| 7,631,946 B2* | 12/2009 | Francischetti | 301/63.104 |
| 7,895,752 B2* | 3/2011 | Sano et al. | 29/894.325 |
| 8,491,062 B2* | 7/2013 | Kihara et al. | 301/63.101 |
| 8,646,851 B2* | 2/2014 | Kihara et al. | 301/64.101 |
| 2005/0017571 A1* | 1/2005 | McCorry et al. | 301/64.101 |
| 2006/0071539 A1* | 4/2006 | Sereno | 301/63.104 |
| 2007/0044311 A1 | 3/2007 | Tanaka | |
| 2010/0253134 A1 | 10/2010 | Sano et al. | |
| 2011/0193404 A1 | 8/2011 | Kihara et al. | |
| 2011/0193405 A1 | 8/2011 | Kihara et al. | |
| 2011/0210603 A1 | 9/2011 | Kihara et al. | |
| 2011/0316324 A1 | 12/2011 | Kihara et al. | |

FOREIGN PATENT DOCUMENTS

| | | |
|---|---|---|
| EP | 1790499 B1 | 10/2009 |
| JP | 2005-35330 A | 2/2005 |
| JP | H09-2003 | 1/2007 |
| JP | 2007-91206 | 4/2007 |
| JP | 2007-137209 | 6/2007 |
| JP | 2007-191025 | 8/2007 |
| JP | 2009-113798 | 5/2009 |
| JP | 2009-113799 | 5/2009 |
| JP | 2010-76464 | 4/2010 |
| WO | WO 03/043836 | 5/2003 |
| WO | WO 03/047882 | 6/2003 |
| WO | WO 2005/089977 | 9/2005 |
| WO | WO 2010/050582 | 5/2010 |
| WO | WO 2010/053113 | 5/2010 |
| WO | WO 2010/053150 | 5/2010 |
| WO | WO 2010/107008 | 9/2010 |

OTHER PUBLICATIONS

English Language Translation of International Search Report issued in PCT/JP2012/058810 mailed May 22, 2012.
English Language Abstract and Translation of JP H09-2003 published Jan. 7, 1997.
English Language Abstract and Translation of JP 2007-91206 published Apr. 12, 2007.
English Language Abstract and Translation of JP 2009-113799 published May 28, 2009.
English Language Abstract and Translation of JP 2010-76464 published Apr. 8, 2010.
English Language Abstract and Translation of JP 2007-191025 published Aug. 2, 2007.
International Preliminary Report on Patentability issued in PCT/JP2012/058810 mailed May 2, 2013.
English Language Translation of International Preliminary Report on Patentability issued in PCT/JP2012/058810 mailed May 2, 2013.
Japanese Office Action issued in JP 2013-513959 dated Mar. 8, 2016 with English Language Translation.
English Language Abstract and Translation for JP 2007-137209 published Jun. 7, 2007.
English Language Abstract and Translation for JP 2009-113798 published May 28, 2009.
English Language Abstract for CN 202294042 published Jul. 4, 2012.

* cited by examiner

“VEHICLE WHEEL DISK

TECHNICAL FIELD

The present technology relates to a vehicle wheel disk.

BACKGROUND

As illustrated in FIG. 21, JP2007-191025 (a conventional vehicle wheel disk) discloses a vehicle wheel disk including a hat portion 1 continuously extending in a circumferential direction of the disk and a plurality of circular vent windows 2 located outwardly of the hat portion 1 in a radial direction of the disk and arranged on a single circle.

The vehicle wheel disk of JP2007-191025 also has a disk portion 3 between adjacent vent windows 2.

BRIEF SUMMARY

At least some embodiments of the present technology may provide a vehicle wheel disk which has improved rigidity and strength compared with those of the conventional vehicle wheel disk.

In one aspect, a vehicle wheel disk is provided that includes:
a hub coupling portion;
a rising wall rising from the hub coupling portion outward in an axial direction of the disk;
a disk flange located at a radially outer end of the disk and extending in a circumferential direction of the disk;
a plurality of spokes, each spoke extending in a radial direction of the disk and connecting the rising wall and the disk flange, a vent window being formed between adjacent spokes of the plurality of spokes; and
a vent window inside wall located outwardly of the rising wall and inwardly of the vent window in the radial direction of the disk, and between the adjacent spokes of the plurality of spokes.

In some aspects, each spoke can include:
a spoke crest connected to the rising wall in the radial direction of the disk and extending outward in the radial direction of the disk;
a spoke radially outer wall connected to the spoke crest, extending outward in the radial direction of the disk and inward in the axial direction of the disk, and connected to the disk flange; and
a pair of spoke circumferential side walls connected to the spoke crest and the spoke radially outer wall in the circumferential direction of the disk and extending inward in the axial direction of the disk.

In a cross section of the spoke along the radial direction of the disk, a connecting portion of the spoke crest with the spoke radially outer wall can have a larger curvature than a remaining curvature of the spoke crest and a curvature of the spoke radially outer wall.

In some aspects, the spoke crest can include a crest inner curved portion curved inward in the axial direction of the disk at a radially inner end portion of the spoke crest, and a crest outer curved portion curved inward in the axial direction of the disk at a radially outer end portion of the spoke crest. A crest circumferential curved portion can be curved inward in the axial direction of the disk at each of circumferentially opposite end portions of the spoke crest, such that each spoke crest has a pair of crest circumferential curved portions. A crest main portion can be located between the crest inner curved portion and the crest outer curved portion in the radial direction of the disk and between the pair of crest circumferential curved portions in the circumferential direction of the disk.

In the cross section of the spoke along the radial direction of the disk, the crest outer curved portion of the spoke crest can have a larger curvature than each of the curvatures of the crest inner curved portion of the spoke crest, the crest main portion of the spoke crest and the spoke radially outer wall.

In some aspects, a difference between an axial height of the disk at the spoke in a first cross section of the disk along the radial direction of the disk, and an axial height of the disk at a center of the vent window in a second cross section of the disk along the radial direction of the disk, increases in a direction from the crest inner curved portion toward the crest outer curved portion of the spoke crest.

In some aspects, the connecting portion of the spoke crest with the spoke radially outer wall can be located radially outer than a central portion in the radial direction of the disk, between a connecting portion of the rising wall with the spoke crest and a connecting portion of the spoke radially outer wall with the disk flange.

In some aspects, a recess receding inward in the axial direction of the disk can be formed at the spoke crest.

In some aspects, an outer wall rib waving in the radial direction of the disk is formed at the spoke radially outer wall.

In some aspects, the hub coupling portion has a plurality of hub bolt holes and the rising wall has a rising wall rib curving in the radial direction of the disk between adjacent hub bolt holes of the plurality of hub bolt holes.

In some aspects, the rising wall rib is provided inside a circumferential center of the vent window in the radial direction of the disk.

As discussed above, in some aspects of the present technology, the spoke includes the spoke crest, the spoke radially outer wall and the pair of spoke circumferential side walls. In the cross section of the spoke along the radial direction of the disk, the crest outer curved portion of the spoke crest can have a larger curvature than each of curvatures of the crest inner curved portion of the spoke crest, the crest main portion of the spoke crest and the spoke radially outer wall. Thus, compared with the conventional spoke, a configuration of the spoke becomes like a box. As a result, a bending strength and a bending rigidity of the spoke in the radial direction of the disk can be increased as compared to the conventional spoke.

As discussed above, in some aspects of the present technology, the difference between the axial height of the disk at the spoke in a first cross section of the disk along the radial direction of the disk and the axial height of the disk at a center of the vent window in a second cross section of the disk along the radial direction of the disk increases outwardly in the radial direction of the disk. Thus, the difference forms a substantially rectangular shape in the cross section of the disk along the radial direction of the disk. As a result, the bending strength and the bending rigidity of the spoke in the radial direction of the disk can be increased as compared to the conventional spoke.

As discussed above, in some aspects of the present technology, the connecting portion of the spoke crest with the spoke radially outer wall is located radially outwardly of the central portion in the radial direction of the disk, between the connecting portion of the rising wall with the spoke crest and the connecting portion of the spoke radially outer wall with the disk flange. Thus, an area of the spoke circumferential side wall can be increased compared with a case where the connecting portion of the spoke crest with the spoke radially outer wall is located radially equal to or radially inwardly of the central portion between the connecting portion of the rising wall with the spoke crest and the connecting portion of the spoke radially outer wall with the disk flange. As a result, the bending rigidity of the spoke in the radial direction of the disk can be increased as compared to the conventional spoke.

As discussed above, in some aspects of the present technology, the recess receding inward in the axial direction of the disk is formed at the spoke crest. As a result, the bending rigidity of the spoke crest in the radial direction of the disk can be increased, compared with a case where the recess is not provided.

As discussed above, in some aspects of the present technology, the outer wall rib curving in the radial direction of the disk is formed at the spoke radially outer wall. As a result, the bending rigidity of the spoke radially outer wall in the radial direction of the disk can be increased, compared with a case where the outer wall rib is not provided.

As discussed above, in some aspects of the present technology, the rising wall has the rising wall rib curving in the radial direction of the disk between adjacent hub bolt holes of the plurality of hub bolt holes. As a result, the bending rigidity of the rising wall in the radial direction of the disk can be increased, compared with a case where the rising wall rib is not provided.

Further, since the rising wall rib is located between adjacent hub bolt holes, the rising wall rib can be prevented from interfering with a disk portion around the hub bolt holes.

As discussed above, in some aspects of the present technology, the rising wall rib is provided radially inside the circumferential center of the vent window. As a result, the bending rigidity of a portion of the rising wall located radially inside the circumferential center of the vent window can be increased as compared to the conventional spoke.

BRIEF DESCRIPTION OF DRAWINGS

Specific examples have been chosen for purposes of illustration and description, and are shown in the accompanying drawings, forming a part of the specification.

DETAILED DESCRIPTION OF THE ILLUSTRATED EMBODIMENTS

FIGS. 1-11 illustrate examples of a vehicle wheel disk according to a first embodiment of the present technology, which may include some alterations. FIGS. 12-20 illustrate examples of a vehicle wheel disk according to a second embodiment of the present technology, which may include some alterations.

First, portions common to the first embodiment and the second embodiment of the present technology will be explained.

A vehicle wheel disk (which may be simply referred to as a wheel disk or a disk, hereinafter) 10, 710 according to some embodiments of the present technology can be used for a passenger car, a truck, a bus and a vehicle for business, etc. The disk 10, 710 may be a disk manufactured from a plate material. In some embodiments, the disk 10, 710 may be a cast disk or a forged disk. The disk 10, 710 may be made from, for example, steel. In some embodiments, the disk 10, 710 may be made from aluminum alloy, titanium alloy, magnesium alloy, or synthetic resin, etc. The disk 10, 710 may be manufactured separately from an annular rim (not shown) for holding a tire (not shown) and then be connected to the rim by a weld, a rivet or an adhesive, etc., to construct a wheel.

Figure 1:
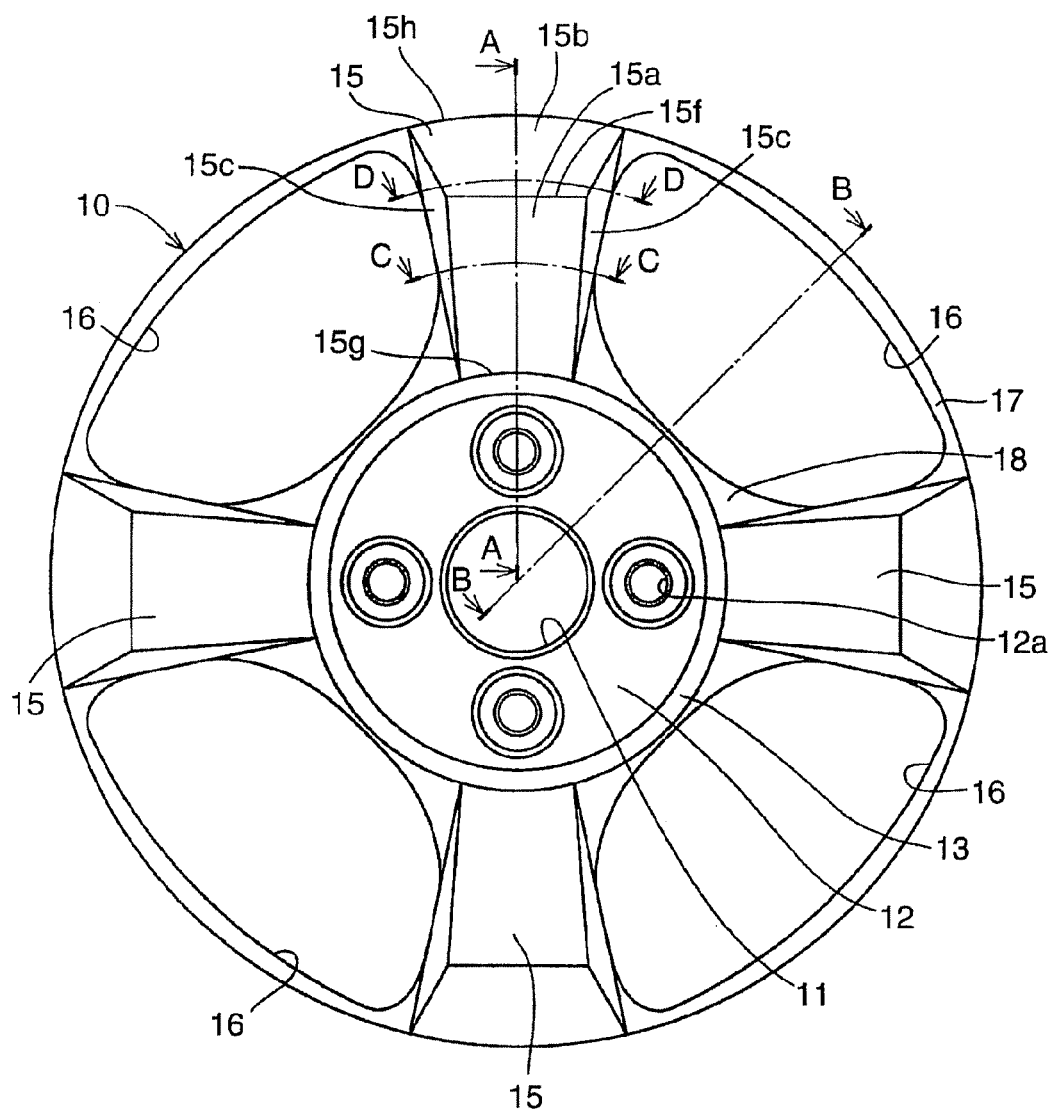
FIG. 1 is a schematic front view of a vehicle wheel disk according to a first embodiment of the present invention.

As illustrated in FIG. 1, the disk 10 may have a hub hole 11, a hub coupling portion 12, a rising wall 13, a disk flange 14 (see FIG. 2), a spoke 15, a vent window 16, a vent window outside wall 17 and a vent window inside wall 18.

The hub hole 11 is located at a radially central portion of the disk 10.

The hub coupling portion 12 is located around the hub hole 11. The hub coupling portion 12 may have a configuration of a flat plate or a substantially flat plate. The hub coupling portion 12 is located in a plane perpendicular or substantially perpendicular to an axial direction of the disk. At the hub coupling portion 12, a plurality of hub bolt holes 12a may be provided. The hub bolt holes 12a may be disposed on a circle having a single radius and at an equal interval in a circumferential direction of the disk. For example, four hub bolt holes 12a may be provided. The number of hub bolt holes 12a is not limited to four. In some embodiments, the number of hub bolt holes 12a may be three, or five or more. In some embodiments, the disk 10 (or the wheel) may be fixed to a hub (not shown) by causing a hub bolt (not shown) extending from the hub of the vehicle to pass through the hub bolt hole 12a and coupling a hub nut (not shown) to the hub bolt. In other embodiments, the disk (or the wheel) 10 may be fixed to the hub by causing a hub bolt to pass through the hub bolt hole 12a and threading the hub bolt into a tapped hole formed in the hub.

The rising wall 13 may be defined as a disk portion which rises outward in the axial direction of the disk and outward in the radial direction of the disk over an entire circumference of the disk from a radially outer end of the hub coupling portion 12. At a disk portion where the spoke 15 is provided in the circumferential direction of the disk, the rising wall 13 may connect the hub coupling portion 12 and the spoke 15. At a disk portion where the vent window 16 is provided in the circumferential direction of the disk, the rising wall 13 may connect the hub coupling portion 12 and a vent window inside wall 18.

Figure 12:
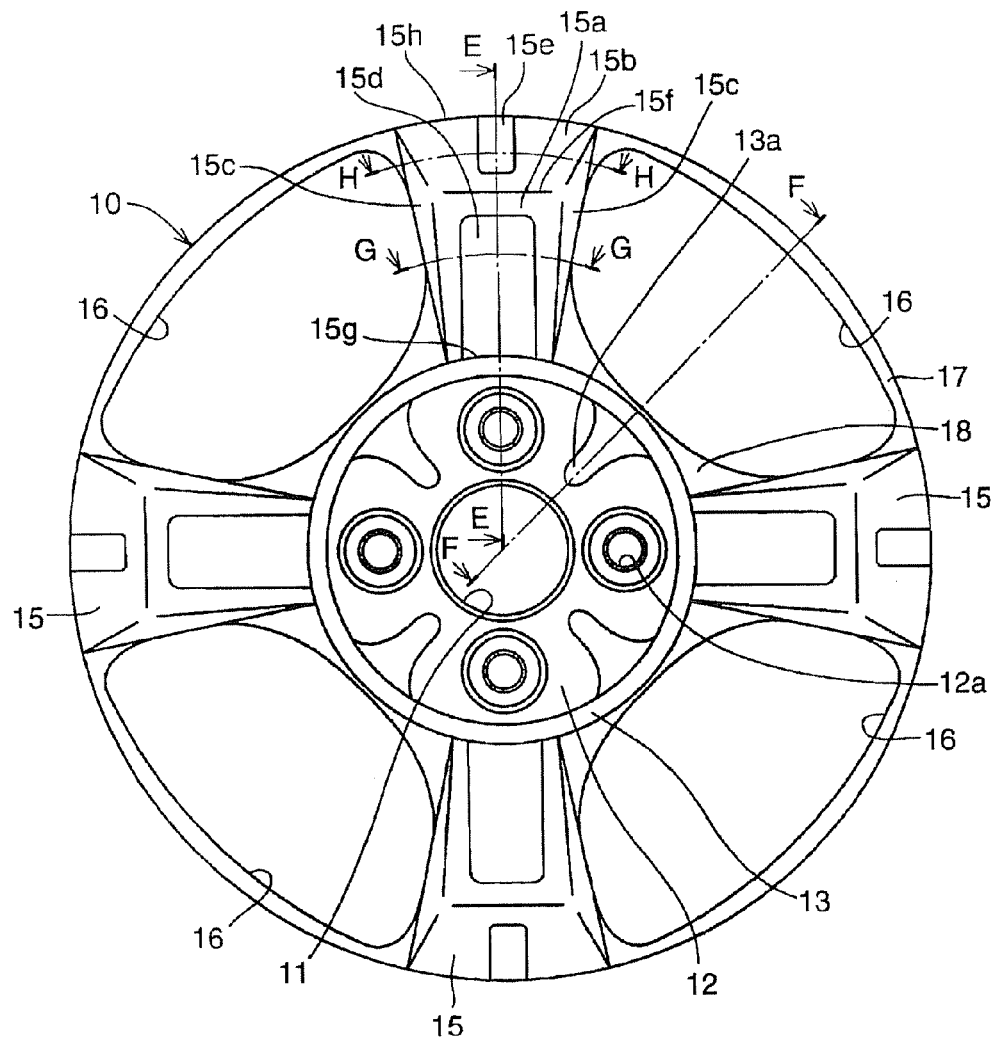
FIG. 12 is a schematic front view of a vehicle wheel disk according to a second embodiment of the present invention.
Figure 17:
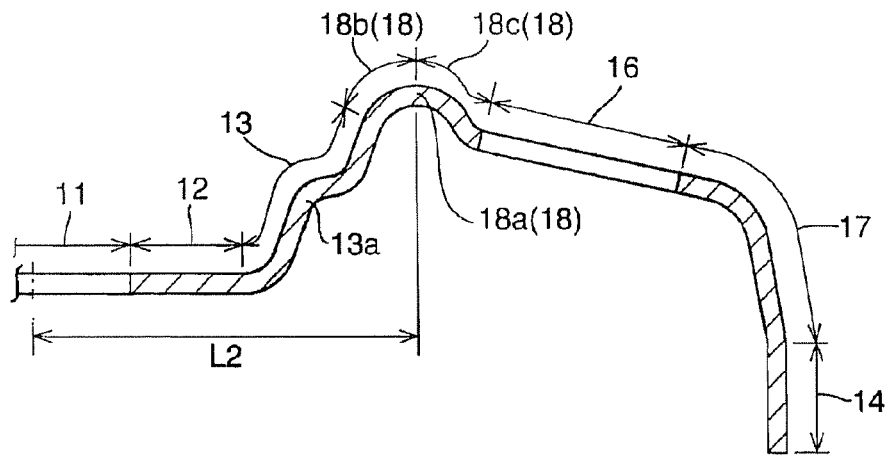
FIG. 17 is an enlarged cross-sectional view of FIG. 12 taken along line F-F of FIG. 12.
Figure 18:
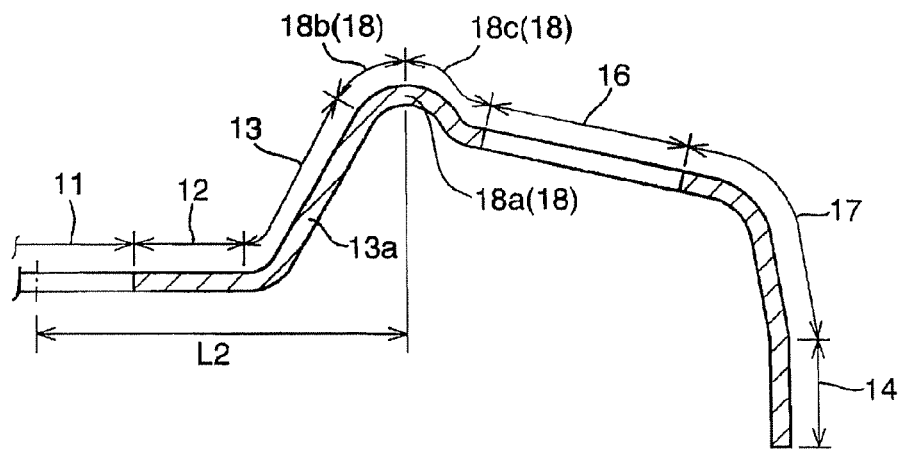
FIG. 18 is an enlarged cross-sectional view of a vehicle wheel disk according to a fourth alteration of the second embodiment of the present invention taken along a line corresponding to line F-F in FIG. 12, where a rising wall rib is provided along an entirety of a rising wall in an axial direction of the disk.
Figure 19:
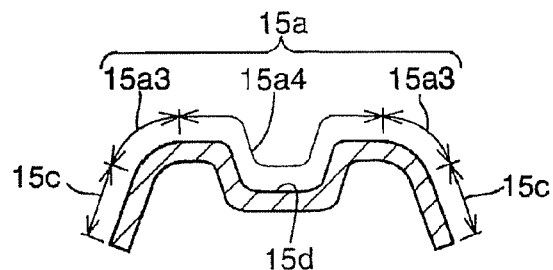
FIG. 19 is a cross-sectional view of FIG. 12 taken along line G-G of FIG. 12.
Figure 20:
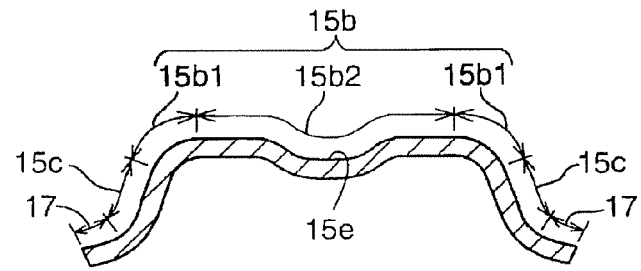
FIG. 20 is a cross-sectional view of FIG. 12 taken along line H-H of FIG. 12.
Figure 21:
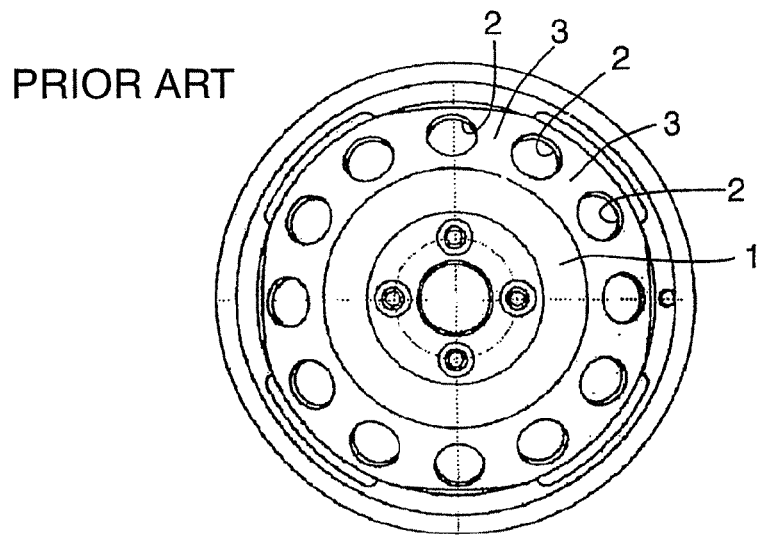
FIG. 21 is a front view of a conventional vehicle wheel disk connected to a rim.

As illustrated in FIG. 12, the rising wall 713 may have a rising wall rib 713a integrally formed at the rising wall 713. The rising wall rib 713a may curve to be concave or convex in the radial direction of the disk (e.g., may be convex inward in the radial direction of the disk) between adjacent hub bolt holes 712a. The rising wall rib 713a may be provided only at a disk portion located radially inside a circumferentially central portion of each vent window 716. The rising wall 713a may be provided only at a disk portion in range from an axially inward end (i.e., a hub coupling portion-side end) of the rising wall 713 to an axially midway portion (an axially central portion) of the rising wall 713 as illustrated in FIG. 17, or at an entirety of the rising wall 1113 in the axial direction of the disk as illustrated in FIG. 18.

Figure 10:
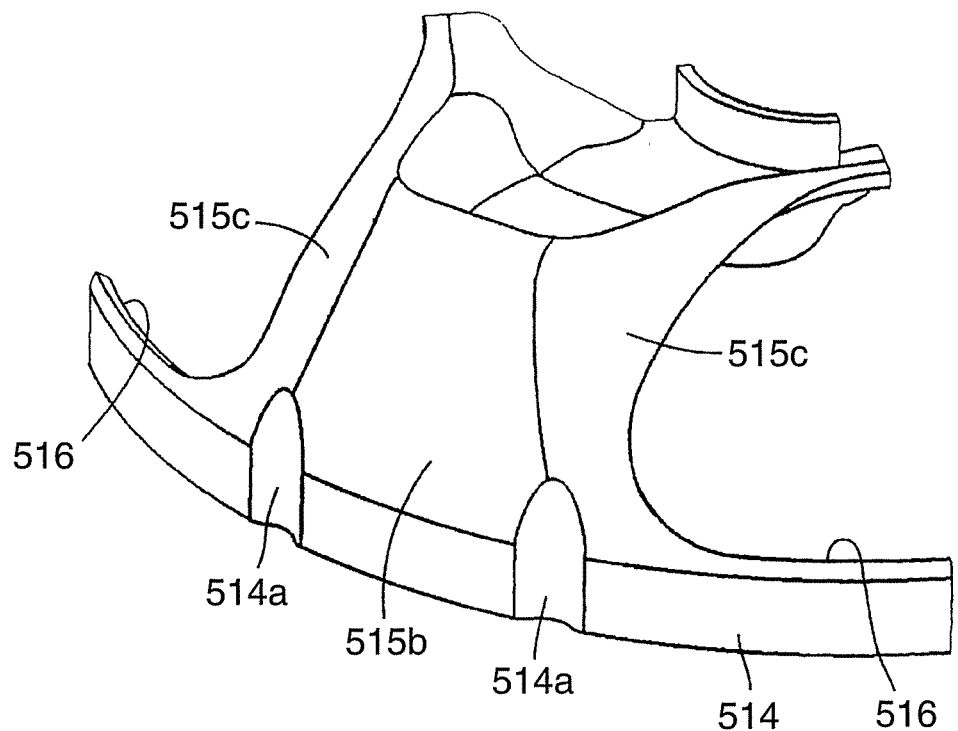
FIG. 10 is a partial, enlarged oblique view of a concave portion and its vicinity of a vehicle wheel disk according to a fifth alteration of the first embodiment of the present invention, where the concave portion is provided at a disk flange.

Referring back to FIG. 1, the disk flange 14 is located at an outer end of the disk 10 in the radial direction of the disk 10. The disk flange 14 may have a configuration of a ring which extends continuously in the circumferential direction of the disk on a single radius over a circumferential entirety of the disk. The disk flange 514, as illustrated in FIG. 10, may have a concave portion 514a that is radially inwardly concave at a portion or portions in the circumferential direction of the disk. The concave portion 514a may be provided at a connecting portion and its vicinity between a spoke radially outer wall 515b and a spoke circumferential side wall 515c of the spoke 515. The concave portion 514a can be provided to increase a rigidity of the disk flange 514.

Figure 11:
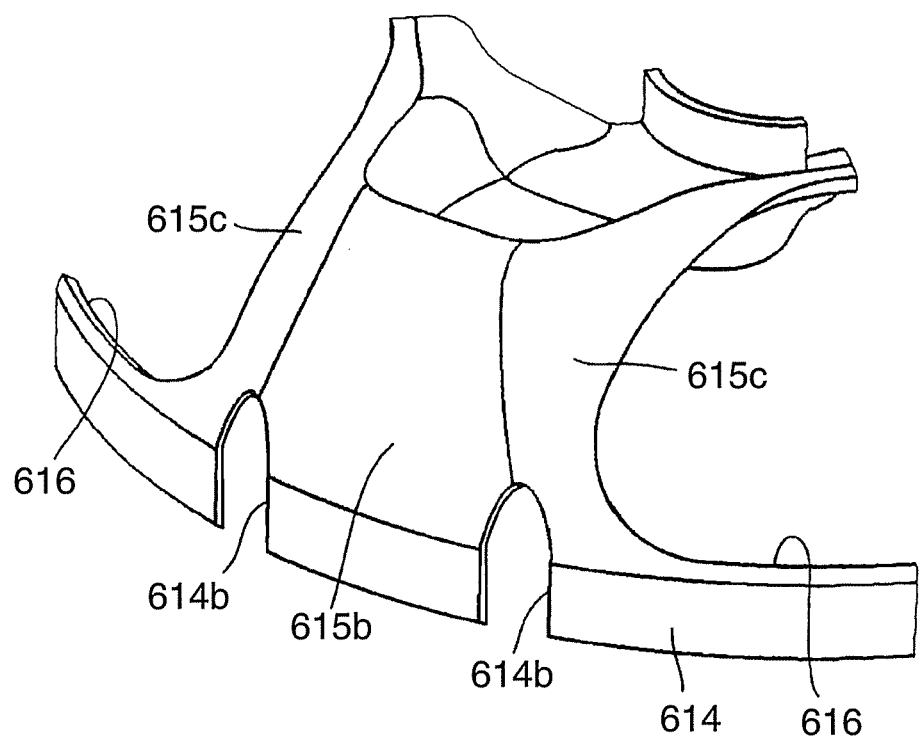
FIG. 11 is a partial, enlarged oblique view of a cut portion and its vicinity of a vehicle wheel disk according to a sixth alteration of the first embodiment of the present invention, where the cut portion is provided at a disk flange.

Further, as illustrated in FIG. 11, the disk flange 614 may have a cut portion 614b. The cut portion 614b may be provided at, for example, a connecting portion and its vicinity between the spoke radially outer wall 615b and the spoke circumferential side wall 615c of the spoke 615. When the cut portion 614b is provided at the connecting portion and its vicinity between the spoke radially outer wall 615b and the spoke circumferential side wall 615c of the spoke 615, a formability of a disk portion defining a corner of the vent window can be improved. When the disk flange 614 has the cut portion 614b, the disk flange 614 has a configuration of a ring which extends discontinuously in the circumferential direction of the disk.

In a cross-sectional view along a radial direction of the disk 10 (in a cross-sectional view along a plane perpendicular to the circumferential direction of the disk), referring back to FIG. 1, the disk flange 14 extends straight in the axial direction of the disk. The disk flange 14 is inserted into a rim (not shown) and is connected (e.g., fixed, welded) to the rim.

Figure 2:
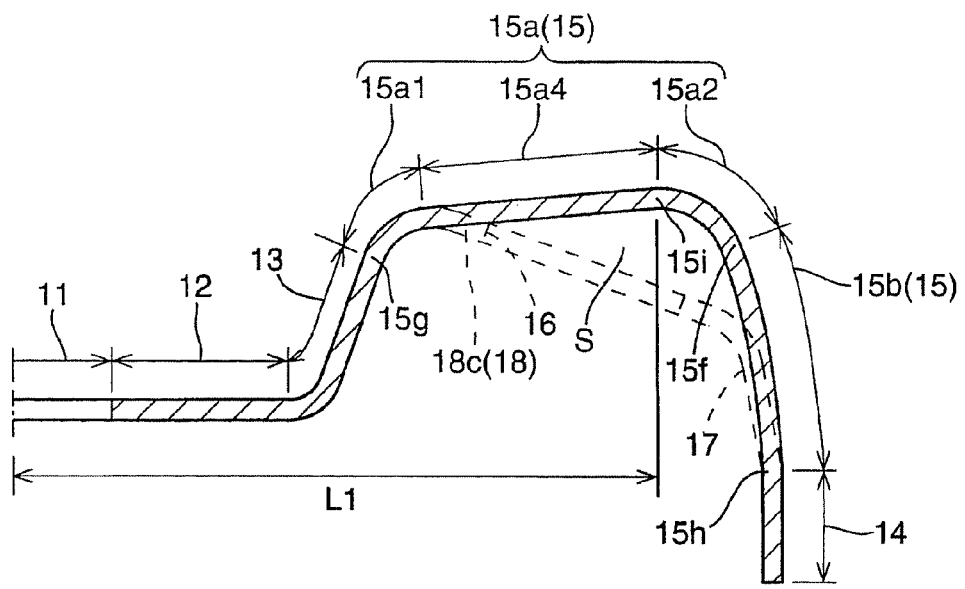
FIG. 2 is an enlarged cross-sectional view of the vehicle wheel disk of FIG. 1 taken along line A-A of FIG. 1, where a hub coupling portion is shown in a flat plate for simplification.
Figure 3:
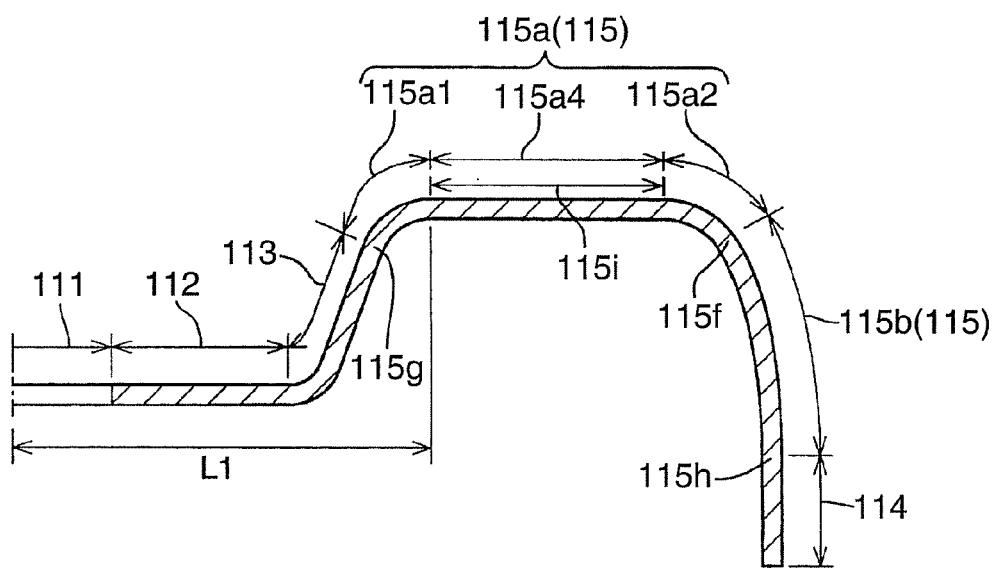
FIG. 3 is an enlarged cross-sectional view of a vehicle wheel disk according to a first alteration of the first embodiment of the present invention taken along a line corresponding to line A-A in FIG. 1, where a first axially outermost portion is provided over an almost entirety of a crest main portion of a spoke crest, wherein a hub coupling portion is shown in a flat plate for simplification.

As illustrated in FIG. 2, the spoke 15 extends in the radial direction of the disk and connects the rising wall 13 and the disk flange 14. The spoke 15 is connected to an axially outward end of the rising wall 13 at a radially inner end of the spoke, and is connected to the disk flange 14 at a radially outer end of the spoke. As illustrated in FIG. 1, the spokes 15 are provided at an equal interval in the circumferential direction of the disk. In some embodiments, four spokes 15 may be provided. The number of spokes 15 is not limited to four. In some embodiments, the number of spokes may be three, or five or more.

The spoke 15 has a spoke crest 15a, the spoke radially outer wall 15b and a pair of spoke circumferential side walls 15c.

In some embodiments, spoke circumferential side walls 15c of the pair of spoke circumferential side walls 15c may be symmetrical with respect to a plane which passes a circumferential center of the spoke 15 and is perpendicular to the circumferential direction of the disk. In some embodiments, the spoke circumferential side walls 15c of the pair of spoke circumferential side walls 15c may be non-symmetrical with respect to the plane which passes the circumferential center of the spoke 15 and is perpendicular to the circumferential direction of the disk.

Figure 7:
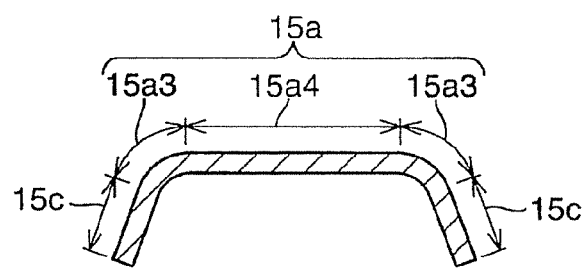
FIG. 7 is a cross-sectional view of the vehicle wheel disk of FIG. 1 taken along line C-C of FIG. 1.

As illustrated in FIG. 2, the spoke crest 15a is connected to the axially outward end of the rising wall 13 at a radially inner end of the spoke crest, and extends outward in the radial direction of the disk. The spoke crest 15a includes a crest inner curved portion 15a1, a crest outer curved portion 15a2, a pair of crest circumferential curved portions 15a3 and a crest main portion 15a4. The crest inner curved portion 15a1 is curved inward in the axial direction of the disk at a radially inner end portion (including its vicinity) of the spoke crest 15a. The crest outer curved portion 15a2 is curved inward in the axial direction of the disk at a radially outer end portion of the spoke crest 15a. The crest circumferential curved portion 15a3 is curved inward in the axial direction of the disk at each of circumferentially opposite end portions of the spoke crest 15a, as illustrated in FIG. 7. A pair of crest circumferential curved portions 15a3 is provided to the spoke crest. The crest main portion 15a4 is located between the crest inner curved portion 15a1 and the crest outer curved portion 15a2 in the radial direction of the disk and between the paired crest circumferential curved portions 15a3 in the circumferential direction of the disk.

As illustrated in FIG. 2, the crest inner curved portion 15a1 is connected to the axially outward end of the rising wall 13.

A length of the spoke crest 15a in the circumferential direction of the disk (a) may be constant along the radial direction of the disk, (b) may be larger toward an outer end or an inner end of the spoke crest along the radial direction of the disk, or (c) may be smaller at a midway portion than at the inner end or at the outer end of the spoke crest along the radial direction of the disk.

As illustrated in FIG. 2, the spoke crest 15a may have a first axially outermost portion 15i constructing an axially outermost portion of the disk in a cross-section of the spoke 15 along the radial direction of the disk.

Figure 13:
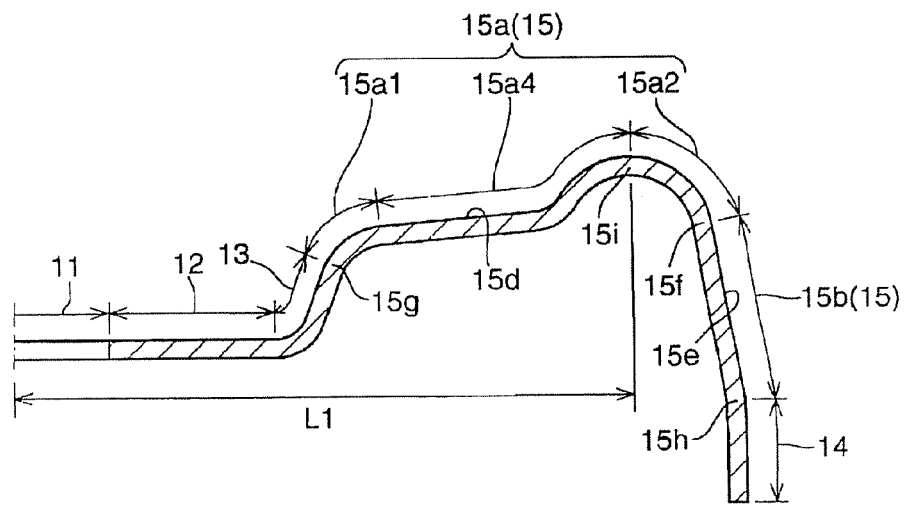
FIG. 13 is an enlarged cross-sectional view of the vehicle wheel disk of FIG. 12 taken along line E-E of FIG. 12, where a hub coupling portion is shown in a flat plate for simplification.
Figure 14:
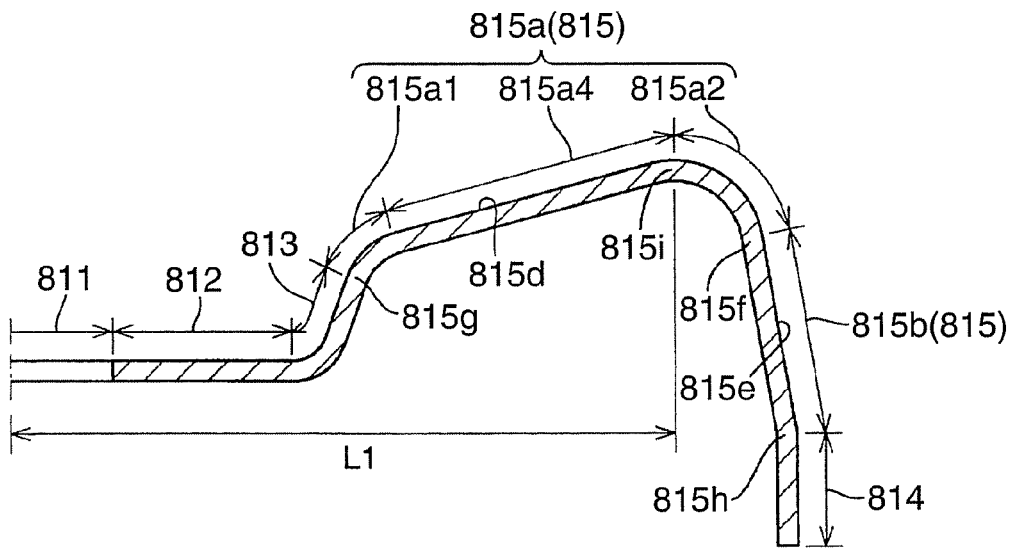
FIG. 14 is an enlarged cross-sectional view of a vehicle wheel disk according to a first alteration of the second embodiment of the present invention taken along a line corresponding to line E-E in FIG. 12, where a recess, an axially inward receding amount of which is increased along a radially inward direction of the disk, is provided at a circumferentially central portion of a spoke crest, wherein a hub coupling portion is shown in a flat plate for simplification.
Figure 15:
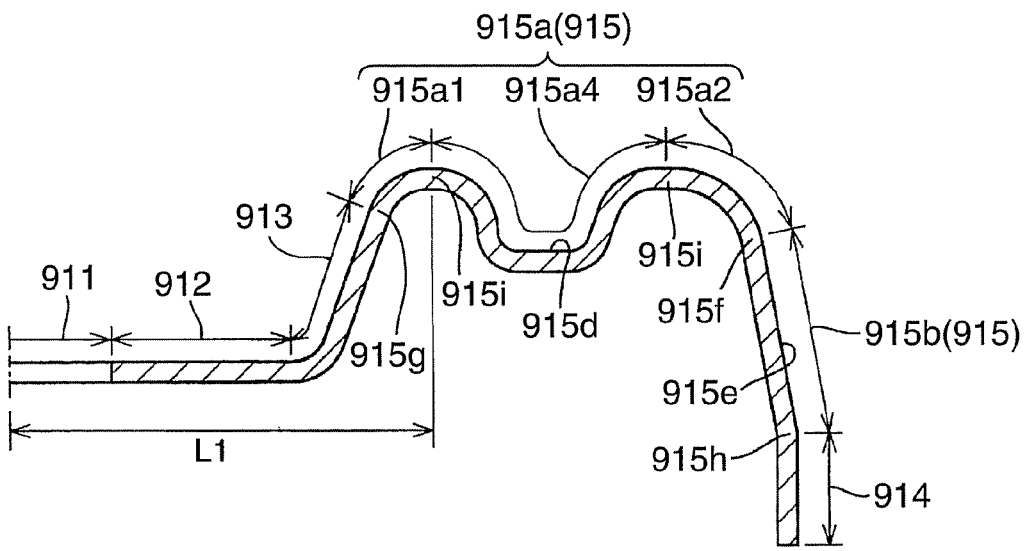
FIG. 15 is an enlarged cross-sectional view of a vehicle wheel disk according to a second alteration of the second embodiment of the present invention taken along a line corresponding to line E-E in FIG. 12, where a recess receding in an axially inward direction of the disk is provided at a circumferentially central portion of a spoke crest and at a radially midway portion only of the spoke crest, wherein a hub coupling portion is shown in a flat plate for simplification.
Figure 16:
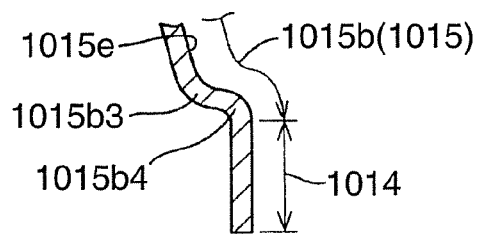
FIG. 16 is a partial, enlarged cross-sectional view of a disk flange and its vicinity of a vehicle wheel disk according to a third alteration of the second embodiment of the present invention, where a spoke radially outer wall has curved portions at a disk flange-side end portion of the spoke radially outer wall.

As illustrated in FIG. 12, the spoke crest 715a may have a recess 715d receding inward in the axial direction of the disk at a central portion of the spoke crest in the circumferential direction of the disk. The recess 715d, 815(d), 915(d) (a) may be provided at a portion of the spoke crest 715a except the crest outer curved portion 715a2 such that an axially receding amount of the recess is constant or substantially constant as illustrated in FIG. 13, (b) may be provided at a portion of the spoke crest 815a except the crest outer curved portion 815a2 such that an axially receding amount of the recess is increased along a radially inward direction of the disk as illustrated in FIG. 14, or (c) may be provided only at a radially midway portion of the spoke crest 915a as illustrated in FIG. 15.

Figure 8:
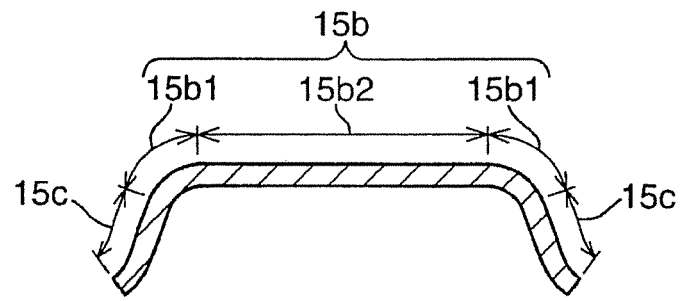
FIG. 8 is a cross-sectional view of the vehicle wheel disk of FIG. 1 taken along line D-D of FIG. 1.

Referring to FIG. 2, the spoke radially outer wall 15b is connected to the crest outer curved portion 15a2 of the spoke crest 15a at a radially inner and axially outer end of the spoke radially outer wall. The spoke radially outer wall 15b extends outward in the radial direction of the disk and inward in the axial direction of the disk. The spoke radially outer wall 15b is connected to the disk flange 14 at a radially outer and axially inner end of the spoke radially outer wall. The spoke radially outer wall 15b extends outward in the radial direction of the disk and inward in the axial direction of the disk from the crest outer curved portion 15a2 of the spoke crest 15a. The spoke radially outer wall 15b is connected to the disk flange 14 at an end in an extending direction of the spoke radially outer wall 15b. As illustrated in FIG. 8, the spoke radially outer wall 15b has a pair of outer wall circumferential curved portions 15b1 curved in the radial direction of the disk at circumferential end portions (including their vicinities) of the spoke radially outer wall 15b and an outer wall main portion 15b2 located between the pair of outer wall circumferential curved portions 15b1 in the circumferential direction of the disk.

A length of the spoke radially outer wall 15b in the circumferential direction of the disk (a) may be constant along the radial direction of the disk, (b) may be larger toward an inward portion or an outward portion in the radial direction of the disk, or (c) may be smaller at a midway portion than at an inward and outward portion in the radial direction of the disk.

As illustrated in FIG. 12, the spoke radially outer wall 715b may have an outer wall rib 715e curving concavely or convexly in the radial (and/or axial) direction of the disk and integrally formed at a midway portion of the spoke radially outer wall in the circumferential direction of the wall. The outer wall rib 715e may be convex inward in the radial direction of the disk (or convex inward in the axial direction of the disk), or may be convex outward in the radial direction of the disk (or convex outward in the axial direction of the disk). When the spoke radially outer wall 715b may have an outer wall rib 715e convex inward in the radial (or axial) direction of the disk, the spoke radially outer wall 715b may have two curved portions 715b3 and 715b4, at a disk flange-side end portion of the spoke radially outer wall (including its vicinity), which are curved at an angle equal to or larger than 45 degrees and equal to or smaller than 90 degrees in the radial cross section of the disk. The outer wall rib 715e may be provided along an entirety (including along substantially the entirety) of the spoke radially outer wall 715b in the radial direction (or the axial direction) of the disk, or may be provided at only a portion of the spoke radially outer wall 715b in the radial direction (or the axial direction) of the disk.

Referring back to FIG. 2, the spoke circumferential side wall 15c is connected to the crest circumferential curved portion 15a3 of the spoke crest 15a and the outer wall circumferential curved portion 15b1 of the spoke radially outer wall 15b at an axially outer end of the spoke circumferential side wall 15c, and extends inward in the axial direction of the disk. The spoke circumferential side wall 15c extends inward in the axial direction of the disk from a circumferential end of the spoke crest 15a and a circumferential end of the spoke radially outer wall 15b. As illustrated in FIG. 7, at a midway portion of the spoke circumferential side wall 15c in the radial direction of the disk, the spoke circumferential side wall 15c has a portion defining a circumferential edge of the vent window 16 not via the vent window outside wall 17.

As illustrated in FIG. 2, a connecting portion (a boundary) 15f of the spoke crest 15a with the spoke radially outer wall 15b may be located radially outwardly of a central portion in the radial direction of the disk, between a connecting portion (a boundary) 15g of the rising wall 13 with the spoke crest 15a and a connecting portion (a boundary) 15h of the spoke radially outer wall 15b with the disk flange 14.

In a cross section of the spoke 15 along the radial direction of the disk, the crest outer curved portion 15a2 of the spoke crest 15a may be curved inward in the axial direction of the disk at a larger curvature than a curvature of the crest inner curved portion 15a1 and a curvature of the crest main portion 15a4, except a curved portion (a bent portion) which may be formed in the spoke crest 15a due to the recess 15d when the recess 15d is formed in the spoke crest 15a.

As illustrated in FIG. 12, In the cross section of the spoke 715 along the radial direction of the disk, the crest outer curved portion 715a2 of the spoke crest 715a may be curved inward in the axial direction of the disk at a larger curvature than a curvature of the spoke radially outer wall 715b, except a curved portion (a bent portion) which may be formed in the spoke radially outer wall 715b due to the outer wall rib 715e when the outer wall rib 715e is formed in the spoke radially outer wall 715b.

As illustrated in FIG. 7, in a cross section of the spoke crest 15a along the circumferential direction of the disk, the crest circumferential curved portion 15a3 of the spoke crest 15a may be curved inward in the axial direction of the disk at a larger curvature than a curvature of the crest main portion 15a4 of the spoke crest 15a, except a curved portion (a bent portion) which may be formed in the spoke crest 15a when the recess 15d is formed in the spoke crest 15a.

In the cross section of the spoke 15 along the circumferential direction of the disk, the crest circumferential curved portion 15a3 of the spoke crest 15a may be curved inward in the axial direction of the disk at a larger curvature than a curvature of the spoke circumferential side wall 15c.

As illustrated in FIG. 8, in a cross section of the spoke radially outer wall 15b along the circumferential direction of the disk, the outer wall circumferential curved portion 15b1 of the spoke radially outer wall 15b may be curved inward in the axial direction of the disk at a larger curvature than a curvature of the outer wall main portion 15b2, except in embodiments such as that illustrated in FIG. 12, where a curved portion (a bent portion) may be formed due to the outer wall rib 715e in the spoke radially outer wall 715b when the outer wall rib 715e is formed at the spoke radially outer wall 715b.

As illustrated in FIG. 8, in a cross section of the spoke radially outer wall 15b along the circumferential direction of the disk, the outer wall circumferential curved portion 15b1 of the spoke radially outer wall 15b may be curved inward in the axial direction of the disk at a larger curvature than a curvature of the spoke circumferential side wall 15c.

Figure 9:
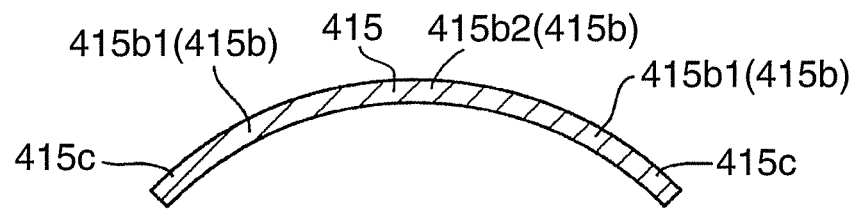
FIG. 9 is a cross-sectional view of a vehicle wheel disk according to a fourth alteration of the first embodiment of the present invention taken along a line corresponding to line D-D in FIG. 1, where a curvature of an outer wall circumferential curved portion of a spoke radially outer wall, a curvature of an outer wall main portion of the spoke radially outer wall and a curvature of a spoke circumferential side wall are the same with each other.

However, as illustrated in FIG. 9, in the cross section of the spoke radially outer wall 415b in the circumferential direction of the disk, the curvature of the outer wall circumferential curved portion 415b1 may be equal to the curvature of the outer wall main portion 415b2 and the curvature of the spoke circumferential side wall 415c. In the case, there may be no definite boundary between the outer wall circumferential curved portion 415b1 and the outer wall main portion 415b2, and there may be no definite boundary between the outer wall circumferential curved portion 415b1 and the spoke circumferential side wall 415c.

As illustrated in FIG. 1, the vent window 16 may be located between adjacent spokes of the plurality of spokes 15. The vent window 16 may be provided at an equal space in the circumferential direction of the wheel. The same number of vent windows 16 may be provided as the number of spokes 15. A configuration of the vent window 16 viewed along the axial direction of the disk may be triangular having rounded corners, though not limited to that configuration.

A portion of a periphery of the vent window 16 located outward in the radial direction of the disk may reach the disk flange 14 and be directly connected to the disk flange 14, or may be connected to the disk flange 14 via the vent window outside wall 17.

Figure 4:
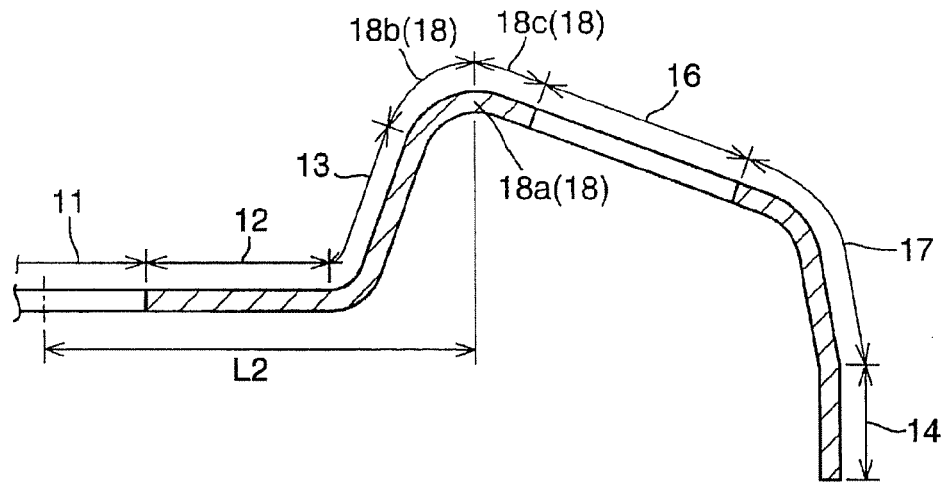
FIG. 4 is an enlarged cross-sectional view of the vehicle wheel disk of FIG. 1 taken along line B-B of FIG. 1.
Figure 5:
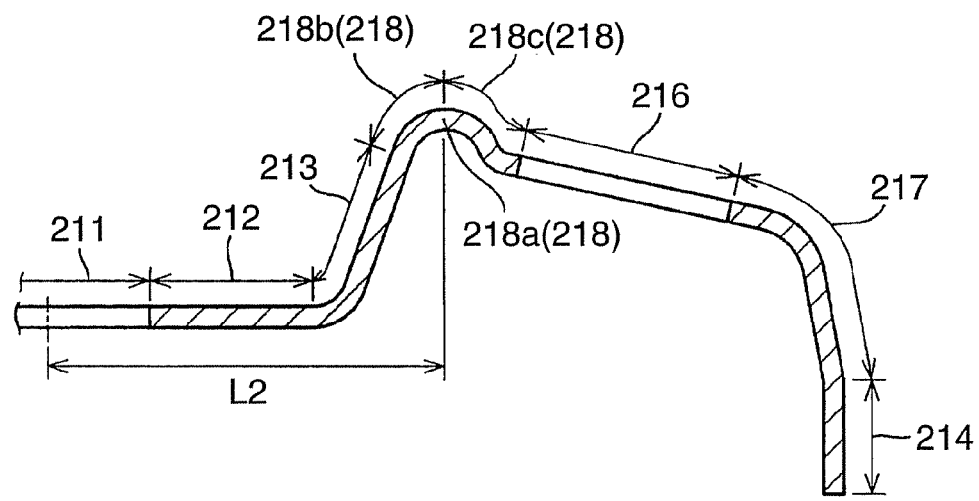
FIG. 5 is an enlarged cross-sectional view of a vehicle wheel disk according to a second alteration of the first embodiment of the present invention taken along a line corresponding to line B-B in FIG. 1, where a vent window inside wall has an axially inward convex portion radially outside a second axially outermost portion.
Figure 6:
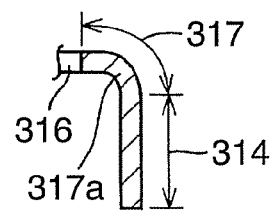
FIG. 6 is a partial, enlarged cross-sectional view of a vent window outside wall and its vicinity of a vehicle wheel disk according to a third alteration of the first embodiment of the present invention, where the vent window outside wall has a curved portion at a disk flange-side end portion of the vent window outside wall.

The vent window outside wall 17 is a disk portion located outwardly of the vent window 16 and inwardly of the disk flange 14 in the radial direction of the disk between adjacent spokes of the plurality of spokes 15. The vent window outside wall 17 may extend straightly outward in the radial direction of the disk and inward in the axial direction of the disk in the cross section of the disk along the radial direction of the disk. Alternatively, the vent window outside wall 17, 217 may be radially and/or axially curved and extend outward in the radial direction of the disk and inward in the axial direction of the disk, as illustrated in FIGS. 4 and 5. As illustrated in FIG. 6, the vent window outside wall 317 may have a curved portion 317a curved at an angle equal to or larger than 45 degrees and equal to or smaller than 90 degrees in the cross section of the vent window outside wall along the radial direction of the disk.

As illustrated in FIG. 1, the vent window inside wall 18 is a disk portion located outer than the rising wall 13 and inner than the vent window 15 in the radial direction of the disk between adjacent spokes of the plurality of spokes 15. As illustrated in FIG. 4, the vent window inside wall 18 is connected to an axially outward end portion of the rising wall 13 and is curved outward in the radial direction of the disk, and extends to the periphery of the vent window 16 outward in the radial direction of the disk.

The vent window inside wall 18 includes a second axially outermost portion 18a, a first extending portion 18b and a second extending portion 18c. The second axially outermost portion 18a constructs an axially outermost portion of the disk in the cross section of the disk along the radial direction of the disk at the vent window 16. The first extending portion 18b can be curves outward in the radial direction of the disk between the rising wall 13 and the second axially outermost portion 18a. The second extending portion 18c is located between the second axially outermost portion 18a and the periphery of the vent window 16. In order to enlarge the periphery of the vent window 16 inward in the radial direction of the disk (i.e., to enlarge a length of the vent window 16 in the radial direction of the disk), the second axially outermost portion 18a may be located next to the periphery of the vent window 16 without via the second extending portion 18c.

A distance L2 (see FIG. 4) of the second axially outermost portion 18a from the center of the disk in the radial direction of the disk may be smaller than a distance L1 of the first axially outermost portion 15i from the center of the disk in the radial direction of the disk. The second axially outermost portion 18a is located more inward than the first axially outermost portion 15i in the axial direction of the disk.

The second axially outermost portion 18a, 218a, 718a, 1118a may be constructed only by a portion convex outward in the axial direction of the disk as illustrated in FIG. 4, or may be constructed by both of a portion convex outward in the axial direction of the disk and a portion convex inward in the axial direction of the disk as illustrated in FIGS. 5, 17 and 18.

As illustrated in FIG. 2, a difference between an axial height (position) of the disk at the spoke 15 in a first cross section of the disk along the radial direction of the disk and an axial height (position) of the disk at a center of the vent window 16 in a second cross section of the disk along the radial direction of the disk increases in a direction from the crest inner curved portion 15a1 toward the crest outer curved portion 15a2 of the spoke crest 15a.

Features common over the first embodiment and the second embodiment of the present invention will now be explained.

In the embodiments of the present technology illustrated in FIGS. 1-20, the spoke 15, 715, etc. includes the spoke crest 15a, 715a, etc., the spoke radially outer wall 15b, 715b, etc., and the pair of spoke circumferential side walls 15c, 715c, etc. In the cross section of the spoke 15, 715, etc. along the radial direction of the disk, the crest outer curved portion 15a2, 715a2, etc. of the spoke crest 15, 715, etc. has a larger curvature than the curvature of the crest inner curved portion 15a1, 715a1, etc. of the spoke crest, the curvature of the crest main portion 15a4, 715a4, etc. of the spoke crest 15a, 715a, etc. and the curvature of the spoke radially outer wall 15b, 715b, etc. Thus, a configuration of the spoke 15, 715, etc. becomes a box-like structure, compared with a conventional spoke. As a result, the bending strength and the bending rigidity of the spoke 15, 715, etc. in the radial direction of the disk can be increased as compared to a conventional spoke.

Further, since the bending strength and the bending rigidity of the spoke 15, 715, etc. in the radial direction of the disk can be increased, even if the vent window 16, 716, etc. is enlarged in order to improve a design without increasing a thickness of the material of the disk 10, 710, etc. the strength and the rigidity of the disk 10, 710, etc. can be ensured.

The difference between the axial height (position) of the disk at the spoke 15, 715, etc. in the first cross section of the disk along the radial direction of the disk and the axial height (position) of the disk at the center of the vent window 16, 716, etc. in the second cross section of the disk along the radial direction of the disk increases in the radial direction of the disk from the crest inner curved portion 15a1, 715a1, etc. toward the crest outer curved portion 15a2, 715a2, etc. Thus, the difference between the axial height of the disk at the spoke 15, 715, etc. in the first cross section of the disk along the radial direction of the disk and the axial height of the disk at the center of the vent window 16, 716, etc. in the second cross section of the disk along the radial direction of the disk, which gradually increases outward in the radial direction of the disk, forms a substantially triangular shape (see FIG. 2) in the cross section of the disk along the radial direction of the disk. As a result, the bending strength and the bending rigidity of the spoke in the radial direction of the disk can be increased as compared to the conventional spoke.

The distance L2 of the second axially outermost portion 18a from the center of the disk in the radial direction of the disk (FIGS. 4-5, 17-18) is smaller than the distance L1 of the first axially outermost portion 15i from the center of the disk in the radial direction of the disk (FIGS. 2-3, 14-15). Thus, a length of the vent window 16 in the radial direction of the disk can be increased so that a design of the disk can be improved, compared with a case where the distance L2 of the second axially outermost portion 18a from the center of the disk in the radial direction of the disk is equal to or larger than the distance L1 of the first axially outermost portion 15i from the center of the disk in the radial direction of the disk.

The connecting portion 15f of the spoke crest 15a with the spoke radially outer wall 15b is located radially outer than the central portion in the radial direction of the disk, between the connecting portion 15g of the rising wall 13 with the spoke crest 15a and the connecting portion 15h of the spoke radially outer wall 15b with the disk flange 14. Thus, an area of the spoke circumferential side wall 15c can be increased so that the bending rigidity of the spoke 15 in the radial direction of the disk can be improved compared to a conventional spoke.

Since the recess 15d receding inward in the axial direction of the disk is formed at the spoke crest 15a, the bending rigidity of the spoke crest 15a in the radial direction, of the disk can be increased, compared with a case where the recess 15d is not provided.

Since the outer wall rib 15e curving concavely or convexly in the radial direction of the disk is provided at the spoke radially outer wall 15b, the bending rigidity of the spoke radially outer wall 15b in the radial direction of the disk can be increased, compared with a case where the outer wall rib 15e is not provided.

Since the rising wall 13 has the rising wall rib 13a curving concavely or convexly in the radial direction of the disk between the hub bolt holes 12a, the bending rigidity of the rising wall 13 in the radial direction of the disk can be increased, compared with a case where the rising wall rib 13a is not provided.

Further, since the rising wall rib 13a is located between the hub bolt holes 12a, the rising wall rib 13a can be prevented from interfering with the disk portions around the hub bolt holes 12a.

Since the rising wall rib 13a is provided radially inside the circumferential center of the vent window 16, the bending rigidity of a portion of the rising wall 13 located radially inside the circumferential center of the vent window 16 can be increased, compared to a conventional spoke.

Next, portions unique to each embodiment of the present invention will be explained.

With respect to the first embodiment, comparing FIGS. 1-11 to FIGS. 12-20, the rising wall 13 does not have the rising wall rib 713a. The spoke crest 15a does not have the recess 715d. The spoke radially outer wall 15b does not have the outer wall rib 715e. With respect to the second embodiment (FIGS. 12-20), the rising wall 713 does have the rising wall rib 713a. The spoke crest 715a does have the recess 715d. The spoke radially outer wall 715b does have the outer wall rib 715e.

The invention claimed is:

1. A vehicle wheel disk comprising:
a hub coupling portion;
a rising wall rising from the hub coupling portion outward in an axial direction of the disk;
a disk flange located at a radially outer end of the disk and extending in a circumferential direction of the disk;
a plurality of spokes, each spoke extending in a radial direction of the disk and connecting the rising wall and the disk flange, and a vent window being formed between adjacent spokes of the plurality of spokes; and
a vent window inside wall located outwardly of the rising wall and inwardly of the vent window in the radial direction of the disk and between adjacent spokes of the plurality of spokes,
wherein each spoke includes:
a spoke crest connected to the rising wall in the radial direction of the disk and extending outward in the radial direction of the disk;
a spoke radially outer wall connected to the spoke crest, extending outward in the radial direction of the disk and inward in the axial direction of the disk from the spoke crest, and connected to the disk flange; and
a pair of spoke circumferential side walls connected to the spoke crest and the spoke radially outer wall in the circumferential direction of the disk and extending inward in the axial direction of the disk from the spoke crest and the spoke radially outer wall,
wherein each spoke crest includes:
a crest inner curved portion curved inward in the axial direction of the disk at a radially inner end portion of the spoke crest;
a crest outer curved portion curved inward in the axial direction of the disk at a radially outer end portion of the spoke crest;
a crest circumferential curved portion curved inward in the axial direction of the disk at each of circumferentially opposite end portions of the spoke crest, a pair of crest circumferential curved portions being provided to the spoke crest; and
a crest main portion located between the crest inner curved portion and the crest outer curved portion in the radial direction of the disk and between the pair of crest circumferential curved portions in the circumferential direction of the disk,
wherein, in a cross section of each spoke along the radial direction of the disk, the crest outer curved portion of the spoke crest has a larger curvature than each of curvatures of the crest inner curved portion of the spoke crest, the crest main portion of the spoke crest and the spoke radially outer wall; and
wherein a difference between: 1) an axial height of the crest main portion of the disk at the spoke in a first cross section of the disk along the radial direction of the disk and 2) an axial height of a vent window-defining edge of the disk at a center of the vent window in a second cross section of the disk along the radial direction of the disk increases in a direction from the crest inner curved portion toward the crest outer curved portion of the spoke crest.

2. A vehicle wheel disk according to claim 1, wherein the connecting portion of the spoke crest with the spoke radially outer wall is located radially outwardly of a central portion in the radial direction of the disk, between a connecting portion of the rising wall with the spoke crest and a connecting portion of the spoke radially outer wall with the disk flange.

3. A vehicle wheel disk according to claim 1, wherein an outer wall rib curving in the radial direction of the disk is formed at the spoke radially outer wall.

4. A vehicle wheel disk according to claim 2, wherein an outer wall rib curving in the radial direction of the disk is formed at the spoke radially outer wall.

5. A vehicle wheel disk according to claim 2, wherein the hub coupling portion has a plurality of hub bolt holes, and the rising wall has a rising wall rib curving in the radial direction of the disk between adjacent hub bolt holes of the plurality of hub bolt holes.

6. A vehicle wheel disk according to claim 1, wherein a recess receding inward in the axial direction of the disk is formed at the spoke crest.

7. A vehicle wheel disk according to claim 6, wherein an outer wall rib curving in the radial direction of the disk is formed at the spoke radially outer wall.

8. A vehicle wheel disk according to claim 6, wherein the hub coupling portion has a plurality of hub bolt holes, and the rising wall has a rising wall rib curving in the radial direction of the disk between adjacent hub bolt holes of the plurality of hub bolt holes.

9. A vehicle wheel disk according to claim 1, wherein an outer wall rib curving in the radial direction of the disk is formed at the spoke radially outer wall.

10. A vehicle wheel disk according to claim 9, wherein the hub coupling portion has a plurality of hub bolt holes, and the rising wall has a rising wall rib curving in the radial direction of the disk between adjacent hub bolt holes of the plurality of hub bolt holes.

11. A vehicle wheel disk according to any one of claim 1, wherein the hub coupling portion has a plurality of hub bolt holes, and the rising wall has a rising wall rib curving in the radial direction of the disk between adjacent hub bolt holes of the plurality of hub bolt holes.

12. A vehicle wheel disk according to claim 11, wherein the rising wall rib is provided inside a circumferential center of the vent window in the radial direction of the disk.

13. A vehicle wheel disk according to claim 1, wherein the connecting portion of the spoke crest with the spoke radially outer wall is located radially outwardly of a central portion in the radial direction of the disk, between a connecting portion of the rising wall with the spoke crest and a connecting portion of the spoke radially outer wall with the disk flange.

14. A vehicle wheel disk according to claim 1, wherein a recess receding inward in the axial direction of the disk is formed at the spoke crest.

15. A vehicle wheel disk according to claim 2, wherein a recess receding inward in the axial direction of the disk is formed at the spoke crest.

16. A vehicle wheel disk according to claim 1, wherein the hub coupling portion has a plurality of hub bolt holes, and the rising wall has a rising wall rib curving in the radial direction of the disk between adjacent hub bolt holes of the plurality of hub bolt holes.

17. A vehicle wheel disk according to claim 1, wherein, in the cross section of each spoke along the radial direction of the disk, an entirety of the crest main portion extends inclined outwardly in the axial direction of the disk and outwardly in the radial direction of the disk.

* * * * *